United States Patent [19]

Barker et al.

[11] 4,201,614

[45] May 6, 1980

[54] SHAKE PANEL ASSEMBLING MACHINE

[75] Inventors: Craig S. Barker, Deerfield Beach, Fla.; Joe L. Bockwinkel, Winlock, Wash.

[73] Assignee: Shakertown Corporation, Winlock, Wash.

[21] Appl. No.: 848,606

[22] Filed: Nov. 4, 1977

[51] Int. Cl.[2] ........................ B29C 19/04; B32B 19/02; B30B 5/02

[52] U.S. Cl. .................................... 156/273; 156/380; 156/560; 100/211; 219/10.53

[58] Field of Search ........ 156/580, 380, 273, 560–562; 100/211

[56] References Cited

U.S. PATENT DOCUMENTS

| | | | |
|---|---|---|---|
| 2,322,226 | 6/1943 | Cunnington | 100/211 |
| 2,479,375 | 8/1949 | Langer | 156/380 |
| 2,646,105 | 7/1953 | Langer | 100/211 |
| 2,806,116 | 9/1957 | Hoagland | 156/273 |
| 3,943,025 | 3/1976 | Russell | 156/580 |

*Primary Examiner*—Douglas J. Drummond

*Attorney, Agent, or Firm*—Robert W. Beach; Ward Brown

[57] ABSTRACT

A feed conveyor supplies resawn split shakes of varying thicknesses to an operator at a shake panel assembling machine. The operator arranges shakes in a row with the shake butts generally aligned and the sawn surfaces of the shakes laid on the upper surface of a backing strip to which thermosetting glue has been applied. The assembly of shakes and backing strip is conveyed by a carrier belt to a press station where a solid but readily deformable elastomer pad is pressed against the rough split upper surfaces of the shakes. The pressure of the pad on the shakes causes the pad to be deformed unevenly to conform to the split surfaces of the uneven and varying thickness shakes so that each shake and all portions of each shake are held in engagement with the backing strip under substantially the same pressure while the glue is set by dielectric heating. When the glue has set, the elastomer pad is released from the shakes and the completed assembly is conveyed by the carrier belt to a discharge conveyor.

11 Claims, 8 Drawing Figures

SHAKE PANEL ASSEMBLING MACHINE

BACKGROUND OF THE INVENTION

1. Field of the Invention

The present invention relates to machines for bonding resawn split shakes to a backing for producing prefabricated shake panels.

2. Prior Art

It is known that thermosetting glue between two articles held in engagement under pressure can be set quickly by dielectric heating to bond the articles together. However, formation of a bond of uniform strength by dielectrically heating thermosetting glue requires that the articles be held together with substantially uniform pressure. Consequently, it has been difficult to obtain uniformly strong bonds between resawn split shakes and a backing because of the difficulty in holding the shakes against the backing under the same pressure. Such difficulty has resulted both from the variation in shake thickness and from the irregularity of the shake split surfaces. Previously shakes have been bonded to backing pieces while being conveyed as shown in U.S. Pat. No. 3,068,920, but the joint made has not been entirely satisfactory.

SUMMARY OF THE INVENTION

The principal object of the present invention is to provide a machine for bonding resawn split shakes to a backing which machine effects uniformly strong bonds between such shakes and the backing.

In accordance with the principal object, it is an object to provide a machine which will effect a uniformly strong bond between a shake and a backing by applying pressure to an irregular surface of the shake.

Further to the principal object, it is an object to provide a machine which will effect uniformly strong bonds between several resawn split shakes and a backing even if the shakes are of different thicknesses.

The foregoing objects can be accomplished by laying the sawn surfaces of resawn split shakes on a backing strip to which thermosetting glue has been applied, pressing a solid but readily deformable elastomer pad against the rough split surfaces of the shakes so that each shake and all portions of each shake are held stationary in engagement with the backing strip under substantially the same pressure, and at the same time setting the thermosetting glue by dielectric heating to bond the shakes to the backing.

DETAILED DESCRIPTION

Figure 1:
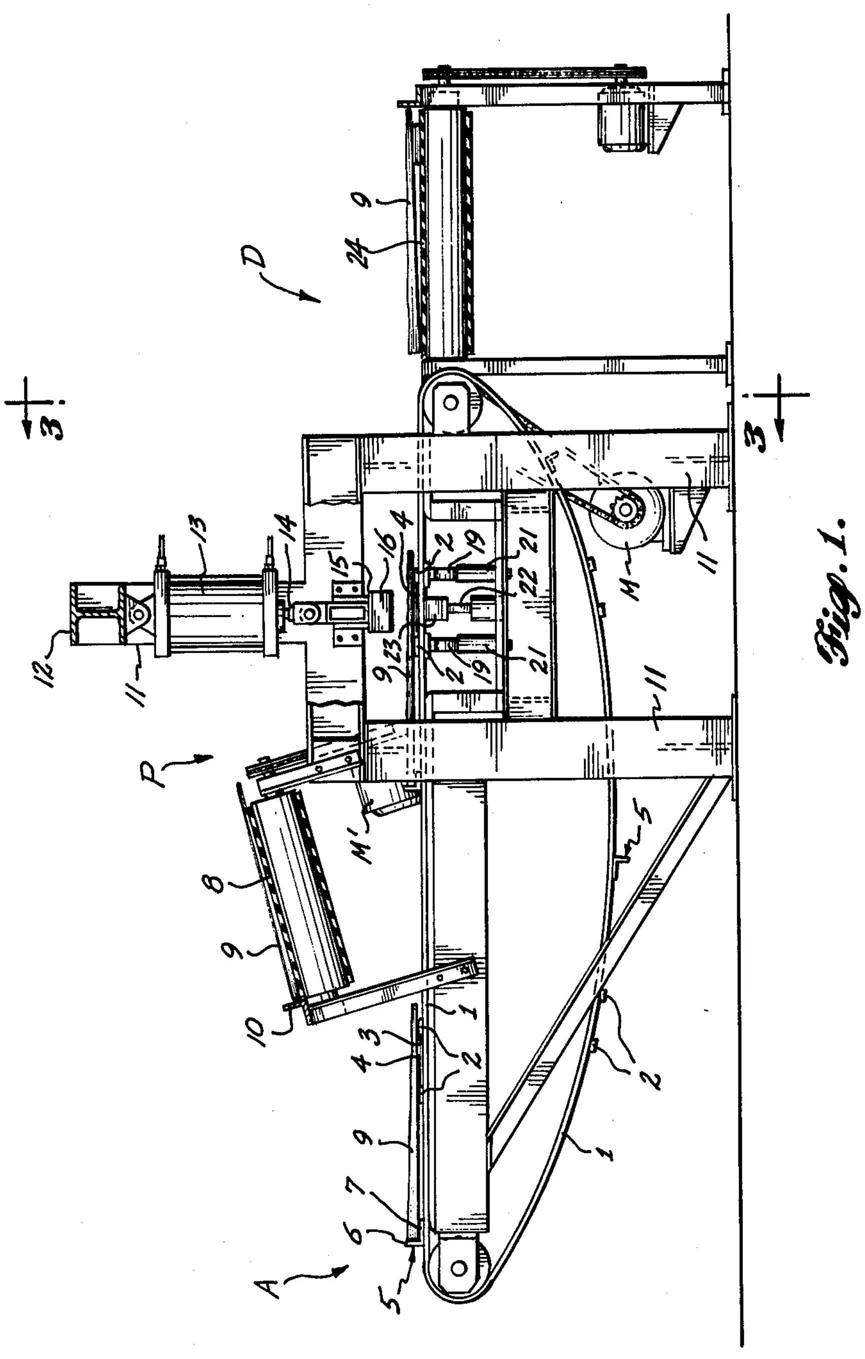
FIG. 1 is a side elevation of a shake panel assembling machine in accordance with the present invention, parts being broken away and parts being shown in section.
Figure 2:
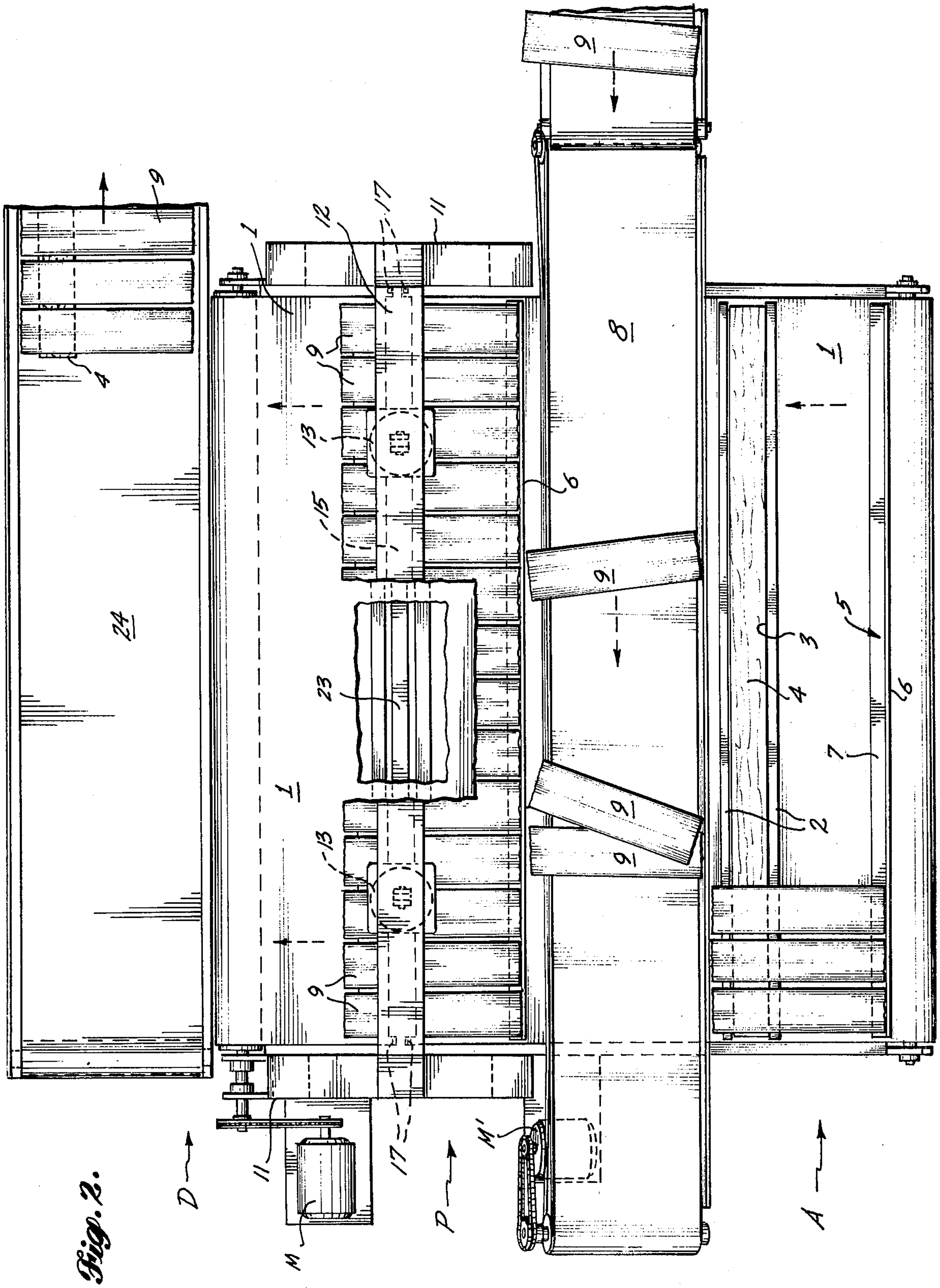
FIG. 2 is a top plan of the shake panel assembling machine of FIG. 1 with parts broken away.

A shake panel assembling machine in accordance with the present invention includes a horizontal carrier belt 1 driven by a motor M and extending from an arranging station A, past a press station P, to a discharge station D. Several pairs of flat cleats 2 extend transversely of the belt, each pair forming a channel 3 for receiving a backing such as a plywood strip 4. Such backing has thermosetting glue on its upper surface opposite the carrier belt. A cleat 5 is positioned upstream of each pair of flat cleats and is of angle cross section including an upright guide flange 6 extending outwardly from the carrier belt and a horizontal spacer flange 7 extending from such guide flange toward the pair of flat cleats to locate the butts of shakes.

A feed conveyor 8 extends transversely of and above carrier belt 1 and is driven by a motor M'. The feed conveyor is within reach of an operator facing the end of the carrier belt at the arranging station and supplies resawn split shakes 9 of uneven thicknesses to such operator. The feed conveyor is tilted transversely downwardly toward the arranging station to afford easy access to the shakes. A rail 10 prevents the shakes from sliding off the tilted feed conveyor onto the carrier belt. The rate of supply of the shakes can be controlled by the operator, for example by a foot pedal switch for motor M'.

At the arranging station, a backing, such as strip 4, having thermosetting adhesive, such as phenolic resin, on one of its surfaces is placed in a channel between a pair of flat cleats 2 with the glue-coated surface of the backing opposite the carrier belt. The operator takes shakes from the feed conveyor 8 and arranges them in a row with the split surfaces of the shakes opposite the carrier belt and the shake butts against angle cleat upright guide flange 6. The distance between such guide flange and the channel between flat cleats 2 is small enough that the shake tip portions overlie the backing. The sawn undersurfaces of the shake tip portions are in substantially contiguous relationship with the upper glue-coated surface of the backing. Consequently, the thickness of the horizontal flange 7 of the angle cleat should be substantially equal to the thickness of the backing and the height of flat cleats 2 should be equal to or less than such thickness.

Once the arranging operation is complete, that is, once the operator has arranged a sufficient number of shakes that the row of shakes extends substantially the entire length of the backing, the operator closes a switch (not shown) to start motor M. The carrier belt 1 shifts the assembly of shakes and backing to press station P and at the same time moves the next set of cleats into position at the arranging station. A limit switch may be provided to deenergize motor M automatically when the shake panel assembly and the next set of cleats are in their proper positions.

Figure 3:
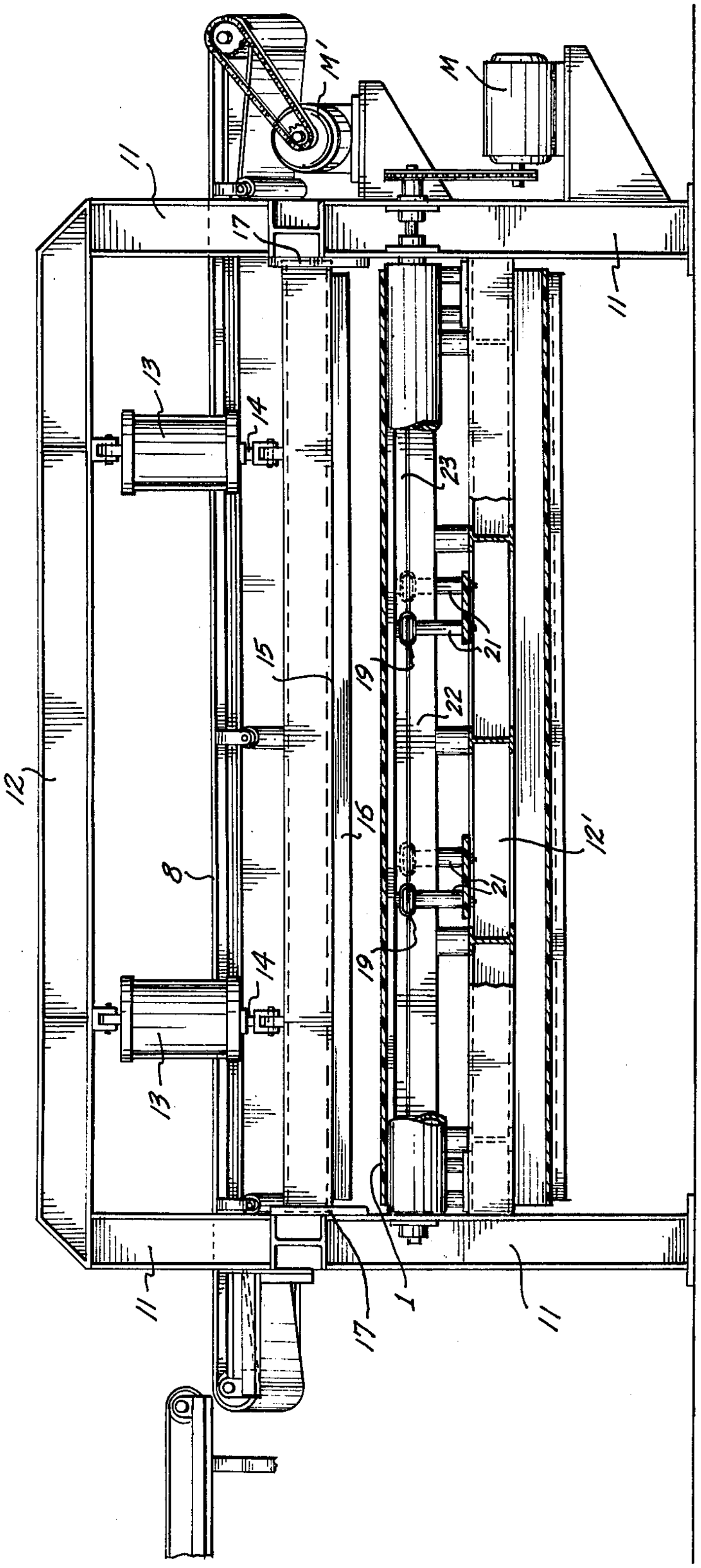
FIG. 3 is a section taken on line 3—3 of FIG. 1 with parts broken away.
Figure 5:
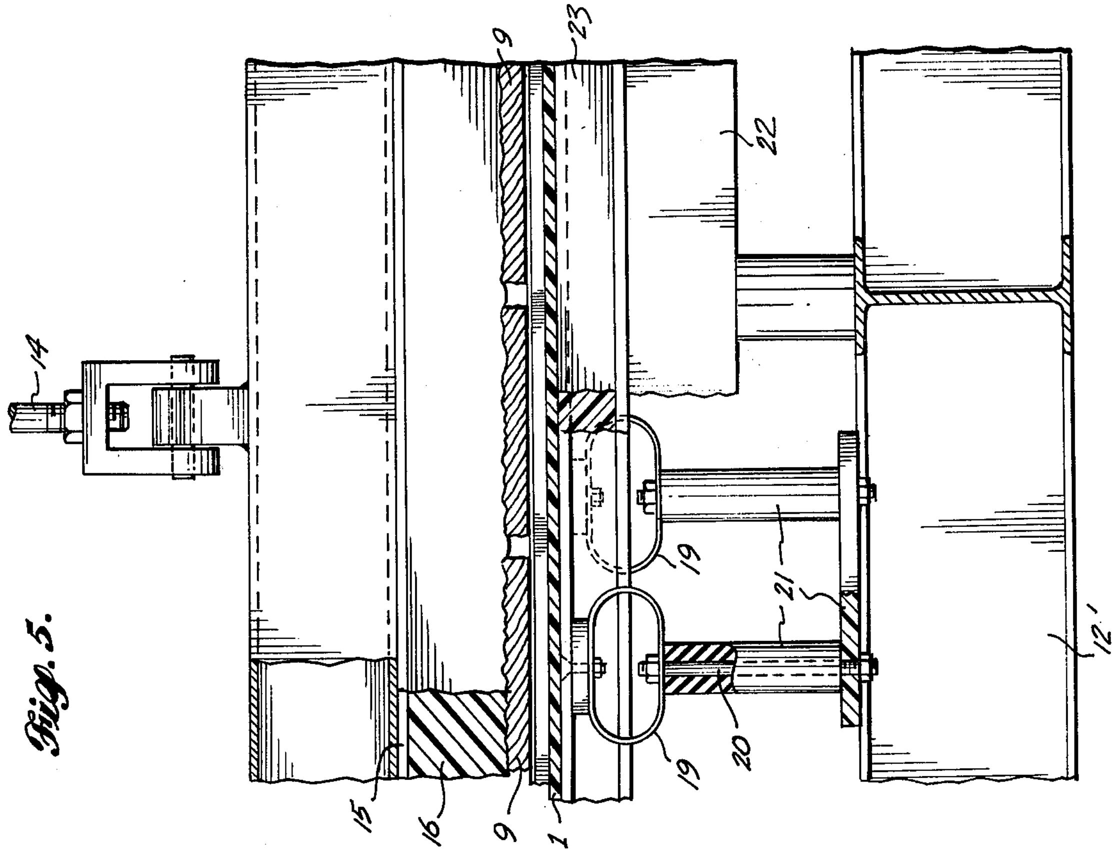
FIG. 5 is a section taken on line 5—5 of FIG. 4.
Figure 4:
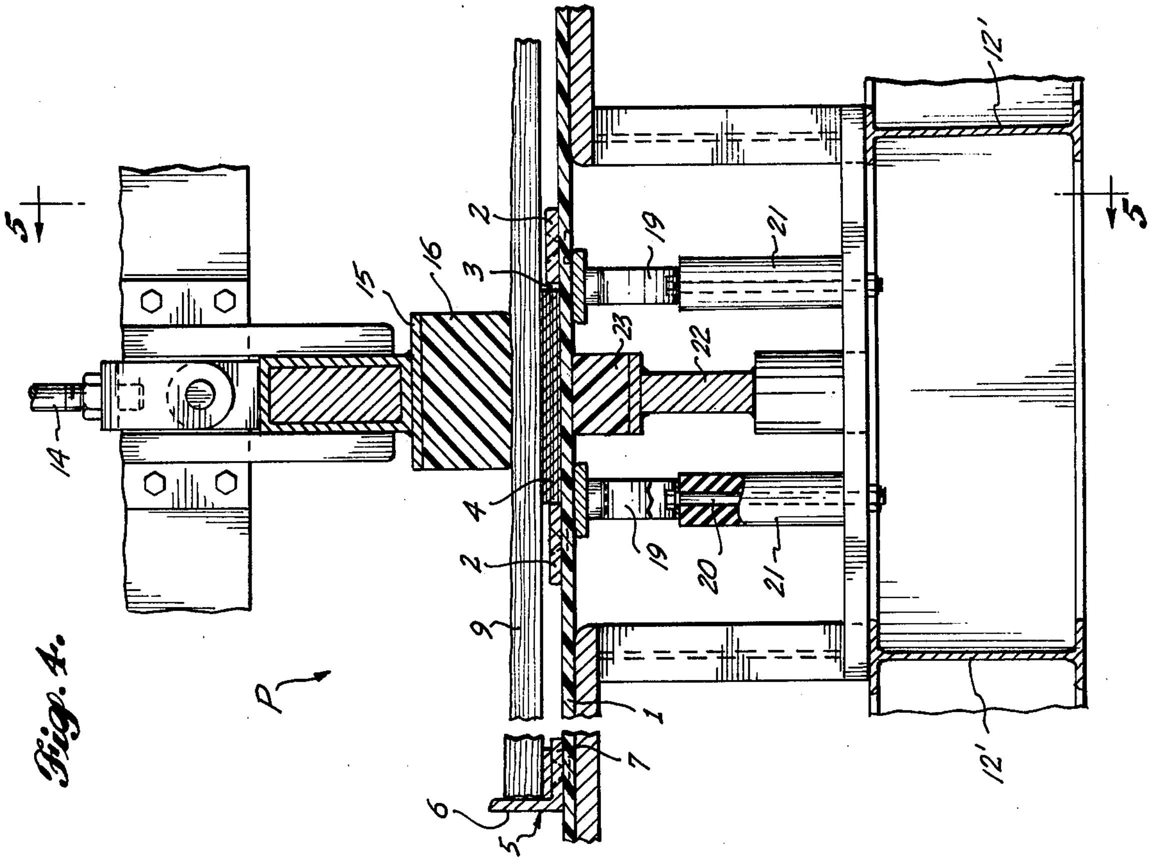
FIG. 4 is an enlarged fragmentary detail of the press station of the shake panel assembling machine of FIG. 1.

The details of the press station are best seen in FIGS. 3, 4 and 5. The press station support structure includes columns 11 at the sides of the carrier belt, an upper cross beam 12 connecting the tops of the side columns above the belt and a lower cross beam 12' extending between the side columns between the upper and lower runs of the carrier belt. Each of two pneumatic cylinders 13 has an upper end secured to the upper cross beam and a downwardly extending double-acting plunger 14 secured to a platen 15. Mounted on the platen undersurface is a solid but readily deformable pad 16 of elastomer material such as solid polyurethane. Flanges 17 on the inner sides of the support columns constitute ways for guiding the platen and its elastomer pad for movement toward and away from the upper run of the carrier belt.

Lower cross beam 12' carries dielectric heating mechanism including brass loops 19 and electrodes 20. Suitable insulation 21 electrically isolates the electrodes from the lower cross beam. Also mounted on the lower cross beam is a backing beam 22 extending transversely under the upper run of the carrier belt directly beneath platen 15.

As best seen in FIGS. 4 and 5, the assembly of backing and shakes, arranged at the arranging station and shifted to the press station by the carrier belt 1, is stopped with the channel 3 between cleats 2 directly under platen 15 and its elastomer pad 16 and directly over backing beam 22. The pneumatic cylinders 13 are actuated to project plungers 14 downward to press the elastomer pad against the irregular upper surfaces of the arranged shakes. Backing beam 22 supports the carrier belt beneath the panel backing 4. The backing beam carries a stiff elastomer pad 23 supporting the carrier belt and the backing slightly yieldingly for allowing enough deflection of the carrier belt that a large amount of pressure may be applied by the platen 15 and its relatively soft presser pad 16 without cracking the shakes or backing.

As best seen in FIG. 5, the upper elastomer pad 16 is sufficiently soft as to conform to the ridges and grooves of the split, irregular upper surfaces of the uneven thickness shakes so that substantially the same pressure is applied to each shake and to all parts of each shake engaged by the pad 16. With the shakes and backing strip held in contiguous engagement under pressure, the dielectric heaters are actuated to set the glue carried by the backing. It has been found that if the upper pad carried by the platen has a durometer hardness of between 20 durometer A and 40 durometer A, preferably 30 durometer A, and the lower pad 23 carried by beam 22 has a durometer hardness of between 80 durometer A and 95 durometer A, preferably 90 durometer A, uniformly strong bonds between the shakes and backing are obtained. Once the glue is set, the pneumatic cylinders 13 are actuated to retract their plungers 14 to raise the platen 15 and its elastomer pad away from the bonded shake panel assembly. The cylinders could be actuated by the same switch that actuates motor M to drive the carrier belt to shift the next arranged assembly from the arranging station to the press station and to shift the bonded shake panel assembly from the press station to a discharge conveyor 24.

Figure 7:
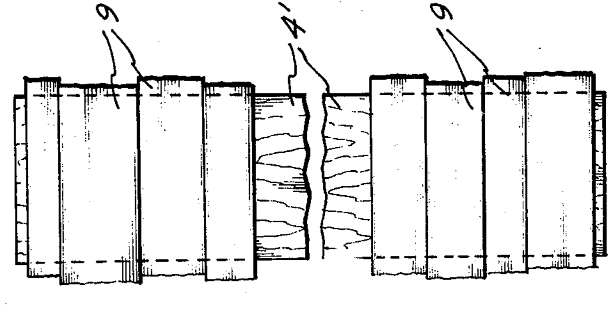
FIG. 7 is a detail of a shake panel produced by the shake panel assembling machine of FIG. 6 with parts broken away.
Figure 6:
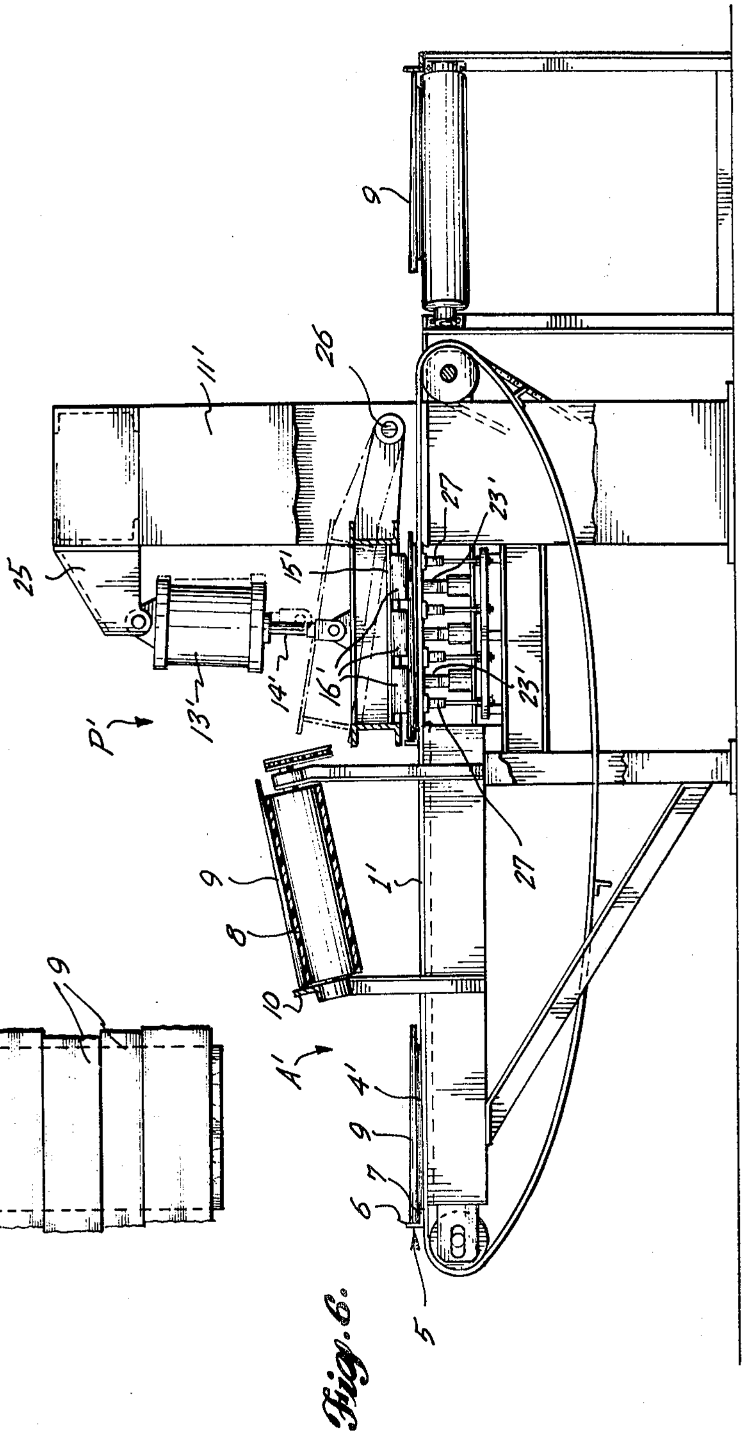
FIG. 6 is a side elevation of an alternative shake panel assembling machine, parts being broken away and parts being shown in section.
Figure 8:
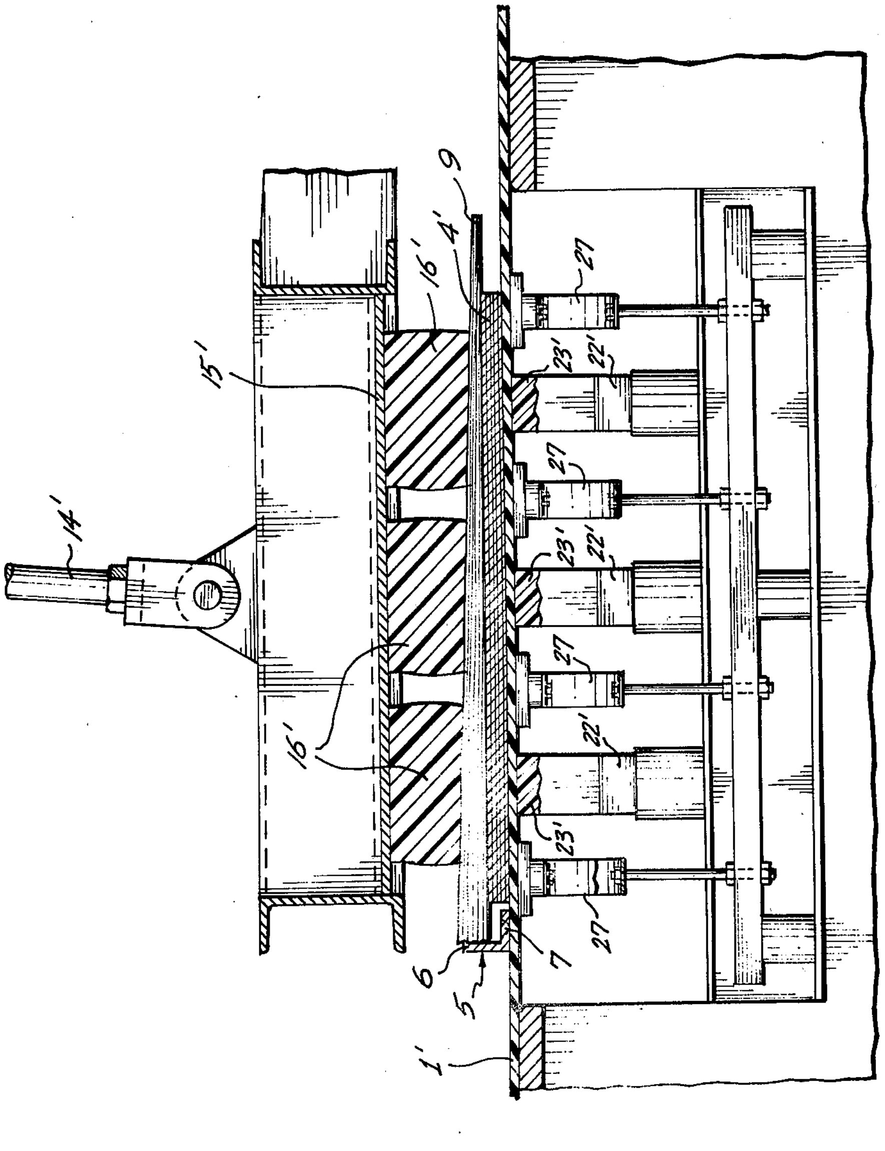
FIG. 8 is an enlarged fragmentary detail of the press station of the shake panel assembling machine of FIG. 6, parts being shown in section.

The modified shake panel assembling machine shown in FIGS. 6 and 8 produces shake panels for sidewalls having wide backings, such as the plywood strip 4' shown in FIG. 7. The operation at the arranging station is substantially identical to the operation described with reference to the shake panel assembly machine of FIG. 1. The wide backing can be set on the carrier belt at the arranging station with one of its longitudinal edges abutting or nearly abutting the horizontal spacer flange 7 of an angle cleat 5. Consequently, carrier belt 1' does not include flat cleats forming channels for the backing. An operator takes resawn split shakes 9 from feed conveyor 8 and arranges them in a row with their sawn surfaces engaging the glue-coated surface of strip 4' and their butts against the angle cleat upright guide flange 6. The carrier belt shifts the assembly of shakes and backing from arranging station A' to press station P'.

The panel-supporting structure of press station P' is somewhat different from the panel-supporting structure previously described in that an upper cross beam 12 connecting the tops of side columns 11' carries cantilever mounting brackets 25 projecting laterally from such beam. One or more pneumatic cylinders 13' have upper ends pivotally secured to the mounting brackets and downwardly extending double-acting plungers 14' pivotally secured to a platen 15'. The platen is mounted for swinging toward and away from the upper run of the carrier belt by pivots 26 extending through support columns 11'. As best seen in FIG. 8, three solid but readily deformable elastomer pads 16' are mounted on the undersurface of platen 15'. Each of the pads is substantially identical to pad 16 previously described and shown in FIGS. 1, 2, 4 and 5. A separate backing beam 22' having a stiff elastomer pad 23' is located directly beneath each upper pad 16'.

The operation at the press station of the assembling machine shown in FIGS. 6 and 8 is substantially identical to the operation of the press station of the assembling machine shown in FIG. 1. Pneumatic cylinder 13' is actuated to project its plunger 14' to press pads 16' against the ridges and grooves of the split, irregular upper surfaces of the shakes. The pads conform to the shape of such surfaces, and the sawn surfaces of the shakes are held in substantially contiguous engagement with backing 4' under substantially uniform pressure. Dielectric heaters 27 set the thermosetting glue carried by the backing, whereupon the cylinders 13' are actuated to retract plungers 14' and the bonded shake panel assembly thus released is transferred by the carrier belt to a discharge conveyor.

We claim:

1. The method of assembling a shake panel which comprises applying thermosetting adhesive on one face of a backing strip, laying a plurality of resawn split shakes in a row on the backing strip with the sawn surfaces of the shakes in engagement with the backing strip and with the split, irregular surfaces exposed, holding the backing strip and shakes laid thereon stationary, pressing a solid readily deformable elastomer pad, of a hardness between 20 durometer and 40 durometer, against the irregular split surfaces of the shakes for applying pressure distributed substantially uniformly and equally over the irregular exposed surface of the shakes, and while the shakes are thus held against the backing, dielectrically setting the adhesive to bond all the shakes to the backing simultaneously.

2. In a machine for bonding to a planar backing wooden shakes having irregular split faces and comparatively smooth sawn backs with such smooth backs in contact with the backing and the irregular faces exposed, including press means for supporting the backing substantially stationarily and for applying pressure on the exposed irregular faces of shakes overlying the backing, the improvement comprising the press means for pressing the shakes against the backing with pressure distributed substantially uniformly and equally over the irregular exposed surface of the shakes including an elongated upper platen of a width less than the length of the shakes, the length of the shakes extending transversely of the length of said upper platen, and having solid elastomer pad means readily deformable, with a hardness between 20 durometer and 40 durometer, for substantially contiguously engaging the exposed irregular faces of the shakes, an elongated lower platen arranged with its length parallel to the length of said upper platen and having a width less than the width of said upper platen solid elastomer pad means and two elongated electrodes located at opposite sides, respectively, of said lower platen and adjacent to said lower platen for effecting bonding of thermosetting adhesive between the smooth sawn backs of the shakes and the planar wooden backing while the shakes are being held against the backing by said upper platen pressing them toward said lower platen.

3. In the machine defined in claim 2, the electrodes at opposite sides of the lower platen being located closer together than the width of the upper platen solid elastomer pad means.

4. In the machine defined in claim 2, a transport belt overlying the lower platen and the electrodes for moving the backing and shakes into position between the upper platen and the lower platen, for supporting the backing and shakes during the pressing and bonding operation of the press means and for transporting the backing and shakes bonded together out of the press after completion of the pressing and bonding operation.

5. A machine for assembling shake panels of wooden shakes having irregular split faces and comparatively smooth sawn backs and a planar backing with such smooth backs in contact with the backing and the irregular faces exposed comprising:

an arranging station including feed means for supplying the shakes;

guide means for positioning the shakes and the backing at said arranging station in a desired arrangement;

a press station including press means for bonding the shakes to the backing and operable to press the shakes against the backing with pressure distributed substantially uniformly and equally over the irregular exposed surfaces of the shakes including solid elastomer pad means deformable, having a hardness between 20 durometer and 40 durometer, for substantially contiguously engaging the exposed irregular faces of the shakes and dielectric heating means for setting thermosetting adhesive between the shakes and the backing; and carrier means for initially maintaining said guide means stationary at said arranging station, next shifting said guide means and the shakes and backing positioned thereby to said press station, and then maintaining such guide means stationary at said press station while the shakes are being bonded to the backing.

6. The machine defined in claim 5, in which the press means includes a frame, a substantially stationary lower platen alongside said frame, an upper platen overlying said lower platen, and means supporting said upper platen from said frame for swinging toward and away from said lower platen including means extending laterally from said upper platen and pivotally mounted on said frame and means for swinging said upper platen away from said lower platen.

7. The machine defined in claim 5, in which the dielectric heating means includes a plurality of elongated electrodes disposed in spaced parallel arrangement at one side of the shakes and backing, a plurality of elongated platens at the same side of the shakes and backing and located, respectively, between adjacent electrodes, and a plurality of elongated parallel platens disposed at the opposite side of the shakes and backing and located in registration, respectively, with said first elongated platens.

8. The machine defined in claim 5, in which the dielectric heating means includes two elongated electrodes disposed in spaced parallel arrangement beneath the carrier means, a lower elongated platen beneath the carrier means and located between and parallel to said electrodes and an upper platen overlying said lower platen and said electrodes, spanning between said electrodes and including the solid elastomer pad means 9. The machine defined in claim 8, the lower platen being yieldable but to a lesser degree than the upper platen, and the electrodes being yieldably mounted.

10. The machine defined in claim 5, in which the guide means include channel means for receiving the backing and flange means acting as guide means relative to which the butts of the shakes can be aligned, said flange means being spaced from said channel means a distance less than the length of a shake and being disposed substantially parallel to said channel means.

11. The machine defined in claim 5, in which the carrier means includes a belt, a cleat extending transversely of said belt, said cleat having a guide flange extending outwardly from said belt for aligning the shake butts, and at least one pair of flat cleats extending transversely of said belt generally parallel to said guide flange and forming a channel for positioning the backing, each flat cleat being of a height no greater than the thickness of the backing, and said channel being spaced from said guide flange a distance less than the length of a shake.

* * * * *